US009560530B2

(12) United States Patent
Kolavennu et al.

(10) Patent No.: US 9,560,530 B2
(45) Date of Patent: *Jan. 31, 2017

(54) PLACEMENT OF A WIRELESS NETWORK ACCESS POINT USING A VORONOI PARTITION

(71) Applicant: Honeywell International Inc., Morristown, NJ (US)

(72) Inventors: Soumitri N. Kolavennu, Blaine, MN (US); Hal Peterson, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/511,641

(22) Filed: Oct. 10, 2014

(65) Prior Publication Data

US 2015/0094070 A1 Apr. 2, 2015

Related U.S. Application Data

(63) Continuation of application No. 13/730,909, filed on Dec. 29, 2012, now Pat. No. 8,880,081.

(51) Int. Cl.
*H04W 16/18* (2009.01)
*H04W 16/00* (2009.01)
(Continued)

(52) U.S. Cl.
CPC ........... *H04W 16/18* (2013.01); *H04W 64/003* (2013.01); *H04W 24/02* (2013.01); *H04W 88/08* (2013.01)

(58) Field of Classification Search
CPC ...... H04W 16/18; H04W 16/00; H04W 16/20; H04W 16/24; H04W 16/30; H04W 88/08; H04W 88/10; H04W 64/00; H04W 64/003; H04W 24/02; H04W 24/04; H04W 4/02
(Continued)

(56) References Cited

U.S. PATENT DOCUMENTS 8,219,116 B1 * 7/2012 Ji ........................ H04W 64/003
455/456.6
2008/0261611 A1 10/2008 Mia et al.
(Continued)

OTHER PUBLICATIONS

Lina Al-Kanj, et al. "A mathematical optimization approach for cellular radio network planning with co-siting", Wireless Networks; The Journal of Mobile Communication, Computation and Information, Kluwer Academic Publishers, Do, vol. 18, No. 5, Feb. 10, 2012, pp. 507-521.
(Continued)

*Primary Examiner* — Meless Zewdu
(74) *Attorney, Agent, or Firm* — Brooks, Cameron & Huebsch, PLLC (57) ABSTRACT

Devices, methods, and systems for placement of a wireless network access point are described herein. One method includes determining a location of any existing wireless network access points of a wireless location system in an area, computing a Voronoi partition around the locations of the existing wireless network access points in the area, wherein the Voronoi partition includes a number of vertices defined by the locations of the existing wireless network access points, and determining a location to place an additional wireless network access point in the area based on the Voronoi partition, wherein the location corresponds to the vertex in the Voronoi partition that is farthest from its defining locations and in the area and has a worst location accuracy as compared to a location accuracy threshold.

18 Claims, 4 Drawing Sheets

(51) Int. Cl.
*H04W 16/24* (2009.01)
*H04W 16/30* (2009.01)
*H04W 64/00* (2009.01)
*H04W 24/02* (2009.01)
*H04W 88/08* (2009.01)

(58) Field of Classification Search
USPC .......................................................... 455/446
See application file for complete search history.

(56) References Cited

U.S. PATENT DOCUMENTS

| | | | |
|---|---|---|---|
| 2008/0261613 A1 | 10/2008 | Anderson et al. | |
| 2011/0051627 A1 | 3/2011 | El-Damhougy | |
| 2011/0136478 A1 | 6/2011 | Trigui | |
| 2011/0287770 A1* | 11/2011 | Kumar ................. | H04W 16/18 455/446 |
| 2011/0292050 A1 | 12/2011 | Gotz | |
| 2012/0100870 A1* | 4/2012 | Prost ........................ | G01S 5/02 455/456.1 |
| 2014/0087754 A1 | 3/2014 | Siomina et al. | |
| 2015/0018005 A1* | 1/2015 | Scarr ................... | H04W 64/003 455/456.1 |
| 2015/0065162 A1* | 3/2015 | Azami ................... | H04W 4/04 455/456.1 |
| 2016/0029305 A1* | 1/2016 | Kim ................. | H04W 52/0206 370/311 |

OTHER PUBLICATIONS

Wissam El-Beaino, et al. "A proactive approach for LTE radio network planning with consideration", Telecommunications (ICT), 2012 19th International Conference on, IEEE, Apr. 23, 2012, pp. 1-5.

EP Search Report related to EP Application 13192036.5, dated Mar. 6, 2015 (3 pages).

* cited by examiner

PLACEMENT OF A WIRELESS NETWORK ACCESS POINT USING A VORONOI PARTITION

CROSS REFERENCE TO RELATED APPLICATION

This application is a continuation of U.S. application Ser. No. 13/730,909, filed Dec. 29, 2012, the entire specification of which is incorporated herein by reference.

TECHNICAL FIELD

The present disclosure relates to devices, methods, and systems for placement of a wireless network access point.

BACKGROUND

A wireless location system can use fixed wireless network access points (e.g., nodes) with known locations to determine the location of a mobile device(s) (e.g., location tag(s)) in an area (e.g., field) of interest, such as a building, refinery, or industrial plant, for example. In such a system, the accuracy of the determined location of the mobile device(s) may decrease with the distance from the mobile device(s) to its nearest access point (e.g., the further the mobile device(s) is away from its nearest access point, the less accurate its determined position may be).

Accordingly, increasing the number of access points in the wireless location system can increase the accuracy of the system (e.g., the more access points included in the system, the greater the accuracy of the system).

Increasing the number of access points in the wireless location system, however, can also increase the cost of the system (e.g., the more access points included in the system, the greater the cost of the system). Further, the wireless location system may have a target accuracy level associated therewith (e.g., the uncertainty of a determined location of a mobile device in the area of the system may not exceed a particular threshold, such as, for instance, 10 meters). Accordingly, access points should be placed in the wireless location system (e.g., the locations of the access points in the system should be selected) such that the target accuracy level of the system is met using the fewest number of access points as possible.

Some previous approaches for placing access points in a wireless location system include selecting the locations of the access points manually. However, selecting the locations of the access points manually can be time consuming, and/or may not provide the cheapest and/or most accurate wireless system possible.

Some previous approaches for placing access points in a wireless location system include selecting the locations of the access points according to a symmetrical (e.g., grid) pattern. However, selecting the locations of the access points according to a symmetrical pattern may be inflexible (e.g., may not account for the characteristics of the area of interest), and/or may not provide the cheapest and/or most accurate wireless system possible.

DETAILED DESCRIPTION

Devices, methods, and systems for placement of a wireless network access point are described herein. For example, one or more embodiments include determining a location of any existing wireless network access points of a wireless location system in an area, computing a Voronoi partition around the locations of the existing wireless network access points in the area, wherein the Voronoi partition includes a number of vertices defined by the locations of the existing wireless network access points, and determining a location to place an additional wireless network access point in the area based on the Voronoi partition, wherein the location corresponds to the vertex in the Voronoi partition that is farthest from its defining locations and in the area and has a worst location accuracy as compared to a location accuracy threshold.

One or more embodiments of the present disclosure can include automatic placement of wireless network access points (e.g., automatic selection of the locations of the access points) in a wireless location system. Selecting the locations of the access points automatically can be less time consuming than previous approaches, and/or may provide cheaper and/or more accurate wireless systems than previous approaches.

Further, one or more embodiments of the present disclosure can include placement of wireless network access points (e.g., selecting the locations of the access points) in a wireless location system in a non-symmetrical (e.g., non-grid) pattern. Selecting the locations of the access points in a non-symmetrical pattern can provide for flexibility (e.g., may account for the characteristics of the area in which the wireless location system is located), and/or may provide cheaper and/or more accurate wireless systems than previous approaches.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of vertices" can refer to one or more vertices.

Figure 1A:
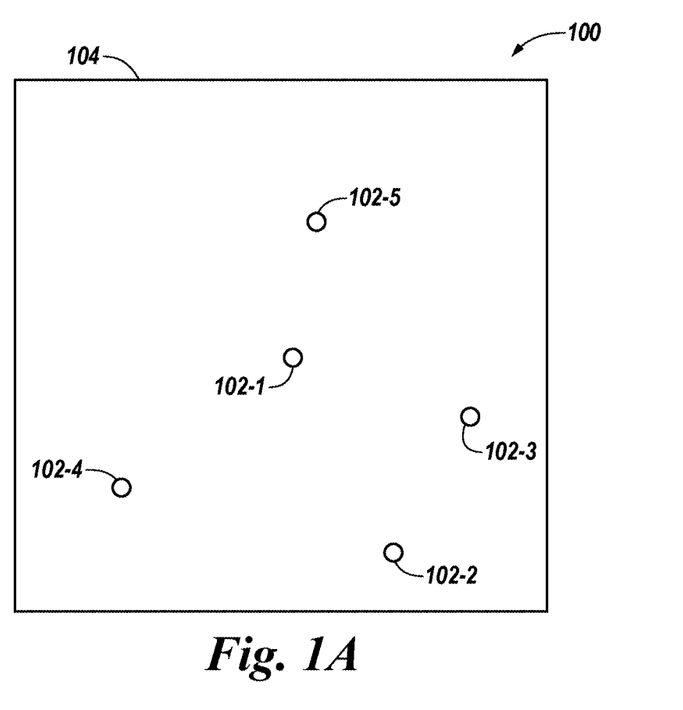
FIGS. 1A-1C illustrate a system for placement of a wireless network access point in accordance with one or more embodiments of the present disclosure.
Figure 1B:
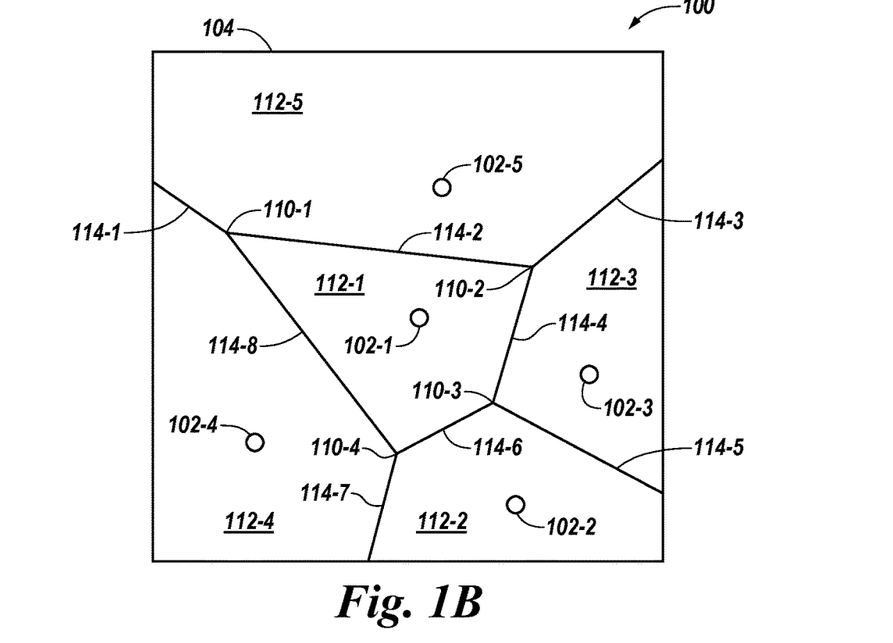
Figure 1C:
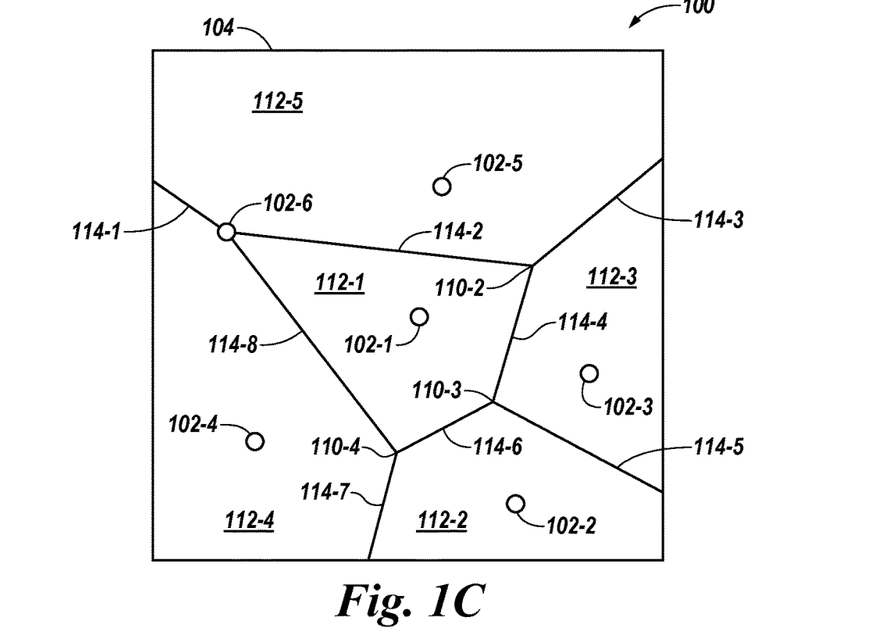

FIGS. 1A-1C illustrate a system 100 for placement of a wireless network access point in accordance with one or more embodiments of the present disclosure. As shown in FIG. 1A, system 100 includes a number of existing (e.g., fixed) wireless network access points (e.g., wireless network access points 102-1, 102-2, 102-3, 102-4, and 102-5) of a wireless location system in an area (e.g., field) of interest 104.

Although five wireless network access points (e.g., nodes) are illustrated in FIG. 1A, embodiments of the present disclosure are not limited to a particular number of wireless network access points. Further, embodiments of the present disclosure are not limited to particular locations in area 104 for the wireless network access points. For example, in some embodiments, a wireless network access point may be located at a corner of area 104, as will be further described herein.

The wireless location system can be any type of wireless system that can determine (e.g., track) the location of a mobile device(s) in an area of interest (e.g., area 104) using a number of wireless network access points (e.g., wireless network access points 102-1, ..., 102-5). That is, a wireless network access point, as used herein, can be any type of wireless device that can be used to determine the location of a mobile device(s) (e.g., location tag(s) worn by a person(s)) in an area of interest. For instance, the wireless location system can be a Wi-Fi, radio frequency (RF), and/or global positioning (GPS) system (e.g., the wireless network access points and mobile device(s) can have Wi-Fi, RF, and/or GPS capabilities).

Area of interest 104 can be any type of area having a wireless location system. For instance, area of interest 104 can be an area of a building, refinery, or industrial plant. Further, although area of interest 104 is a square in the embodiment illustrated in FIG. 1A, embodiments of the present disclosure are not limited to a particular shape for area of interest 104.

In some embodiments, the location of each wireless network access point 102-1, ..., 102-5 in area 104 can be determined. The location of each wireless network access point can be determined, for example, by a computing device, such as computing device 340 further described herein (e.g., in connection with FIG. 3). For instance, the computing device can determine the location of each wireless network access point by receiving (e.g., from the wireless network access points) the coordinates of the wireless network access points. In some embodiments, the locations of the wireless network access point 102-1, ..., 102-5 may already be known by the computing device (e.g., the computing device may not need to determine the locations of the wireless network access points).

As shown in FIG. 1B, a Voronoi partition (e.g., region) around the locations of wireless network access points 102-1, ..., 102-5 in area 104 can be computed (e.g., by the computing device). The Voronoi partition can include a number of vertices (e.g., vertices 110-1, 110-2, 110-3, and 110-4) defined by the locations of the wireless network access points, as shown in FIG. 1B. For instance, in the embodiment illustrated in FIG. 1B, each vertex 110-1, ..., 110-4 can be defined by the locations of three (e.g., a different trio) of the wireless network access points. For instance, vertex 110-1 can be defined by the locations of wireless network access points 102-1, 102-4, and 102-5, vertex 110-2 can be defined by the locations of wireless network access points 102-1, 102-3, and 102-5, vertex 110-3 can be defined by the locations of wireless network access points 102-1, 102-2, and 102-3, and vertex 110-4 can be defined by the locations of wireless network access points 102-1, 102-2, and 102-4.

As shown in FIG. 1B, the Voronoi partition around the locations of wireless network access points 102-1, ..., 102-5 in area 104 can be computed by dividing area 104 into a number of regions (e.g., regions 112-1, 112-2, 112-3, 112-4, and 112-5) around the locations of the wireless network access points in area 104 using a number of line segments (e.g., line segments 114-1, 114-2, 114-3, 114-4, 114-5, 114-6, 114-7, and 114-8). Each line segment can be equidistant from two (e.g., a different pair) of the wireless network access points. For instance, as shown in FIG. 1B, line segment 114-1 is equidistant from wireless network access points 102-4 and 102-5, line segment 114-2 is equidistant from wireless network access points 102-1 and 102-5, line segment 114-3 is equidistant from wireless network access points 102-3 and 102-5, line segment 114-4 is equidistant from wireless network access points 102-1 and 102-3, line segment 114-5 is equidistant from wireless network access points 102-2 and 102-3, line segment 114-6 is equidistant from wireless network access points 102-1 and 102-2, line segment 114-7 is equidistant from wireless network access points 102-2 and 102-4, and line segment 114-8 is equidistant from wireless network access points 102-1 and 102-4.

Further, each vertex can correspond to a different intersection of line segments. For example, as shown in FIG. 1B, each line segment 114-1, ..., 114-8 can intersect with two other line segments at a location equidistant from the three closest wireless network access points in the area, and each intersection can correspond to a different vertex 110-1, ..., 110-4. For instance, as shown in FIG. 1B, vertex 110-1 corresponds to the intersection of line segments 114-1, 114-2, and 114-8, vertex 110-2 corresponds to the intersection of line segments 114-2, 114-3, and 114-4, vertex 110-3 corresponds to the intersection of line segments 114-4, 114-5, and 114-6, and vertex 110-4 corresponds to the intersection of line segments 114-6, 114-7, and 114-8. Further, each vertex (e.g., each line segment intersection) can be adjacent three different regions. For instance, as shown in FIG. 1B, vertex 110-1 is adjacent regions 112-1, 112-4, and 112-5, vertex 110-2 is adjacent regions 112-1, 112-3, and 112-5, vertex 110-3 is adjacent regions 112-1, 112-2, and 112-3, and vertex 110-4 is adjacent regions 112-1, 112-2, and 112-4.

Further, each region can include a different one of the wireless network access points, with the wireless network access point in a region being the wireless network access point that is closest to all points in that region. For example, as shown in FIG. 1B, region 112-1 includes wireless network access point 102-1, region 112-2 includes wireless network access point 102-2, region 112-3 includes wireless network access point 102-3, region 112-4 includes wireless network access point 102-4, and region 112-5 includes wireless network access point 102-5.

Further, each region can have a location accuracy threshold associated therewith (e.g., a location accuracy threshold selected by the operator of the system). The location accuracy threshold can be, for example, a threshold for the uncertainty in a determined location of a mobile device in the area of the system (e.g., the possible distance between the determined location of the mobile device and the actual location of the mobile device), such as, for instance, 10 meters. In some embodiments, each region can have the same location accuracy threshold associated therewith, and in some embodiments each region can have a different location accuracy threshold associated therewith.

Further, a number of the line segments can intersect with a boundary (e.g., an outer edge) of the area. For example, as shown in FIG. 1B, line segments 114-1, 114-3, 114-5, and 114-7 intersect with a boundary of area 104.

A location to place an additional wireless network access point in the area can be determined (e.g., by the computing device) based on the computed Voronoi partition. For example, in some embodiments, the location to place the additional wireless network access point can correspond to the vertex in the Voronoi partition that is farthest from its defining locations and in the area. That is, the location to place the additional wireless network access point can correspond to the line segment intersection that is farthest from its three closest wireless network access points and in the area. For example, in the embodiment illustrated in FIG. 1B, the location to place the additional wireless network access point can correspond to vertex 110-1, because vertex 110-1 is the vertex that is farthest from its defining locations in area 104. That is, in the embodiment illustrated in FIG. 1B, the location to place the additional wireless network access point can correspond to the intersection of line segments 114-1, 114-2, and 114-8, because that line segment intersection is the line segment intersection that is farthest from its three closest wireless network access points in area 104.

In some embodiments, the location to place the additional wireless network access point can correspond to the line segment intersection with the boundary of the area that is farthest from its three closest wireless network access points. For example, in the embodiment illustrated in FIG. 1B, the location to place the additional wireless network access point can correspond to the intersection of line segment 114-1 and the boundary of area 104, because that line segment-boundary intersection is the line segment-boundary intersection that is farthest from its three closest wireless network access points.

In some embodiments, the location to place the additional wireless network access point can correspond to the vertex in the Vornoi partition having the worst predicted and/or measured location accuracy in the area (e.g., the vertex at which the predicted and/or measured uncertainty in the determined location of the mobile device in the area is greatest). For example, the location to place the additional wireless network access point can correspond to the vertex in the Vornoi partition having the worst predicted and/or measured location accuracy as compared to the location accuracy threshold associated with each region (e.g., the vertex at which the difference between the predicted and/or measured location accuracy of the vertex and the location accuracy threshold is greatest). For instance, in embodiments in which each region has a different location accuracy threshold associated therewith, the vertex in the Voronoi partition having the worst predicated and/or measured location accuracy may be the vertex at which the difference between the predicted and/or measured location accuracy of the vertex and the location accuracy threshold associated with a region adjacent the vertex is greatest.

The vertex having the worst predicted and/or measured location accuracy in the area may or may not be the vertex that is farthest from its defining locations. For instance, in the embodiment illustrated in FIG. 1B, the vertex having the worst predicted and/or measured location accuracy in area 104 may or may not be vertex 110-1.

The additional wireless network access point can then be placed at the determined location in the area. For example, as shown in FIG. 1C, additional wireless network access point 102-6 can be placed at vertex 110-1 (e.g., at the intersection of line segments 114-1, 114-2, and 114-3). Additionally and/or alternatively, in embodiments in which area 104 is a square, an additional wireless network access point can be placed at a number (e.g., each) of the corners of the square.

After the additional wireless network access point (e.g., wireless network access point 102-6 shown in FIG. 1C) is placed at the determined location in the area, it can be determined (e.g., by the computing device) whether another additional wireless network access point is needed in the area. In some embodiments, another additional wireless network access point may be needed in the area if the predicted and/or measured location accuracy of the wireless location system in the area does not meet or exceed a particular location accuracy threshold (e.g., a location accuracy threshold selected by the operator of the system). The location accuracy threshold can be, for example, a threshold for the uncertainty in a determined location of a mobile device in the area of the system, as previously described herein.

In some embodiments, another (e.g., a second) additional wireless network access point may be needed in the area if the number of existing wireless network access points (e.g., wireless network access points 102-1, . . . , 102-5) and the additional wireless network access points (e.g., 102-6) does not meet or exceed a particular number of wireless network access points (e.g., a particular number of wireless network access devices selected by the operator of the wireless location system).

For example, in the embodiment illustrated in FIG. 1C, another additional wireless network access point may be needed if the particular number of wireless network access points is greater than six.

If it is determined that another additional wireless network access point is needed, an additional Voronoi partition around the locations of the existing wireless network access points and the additional wireless network access point (e.g., wireless network access points 102-1, . . . , 102-6) in the area can be computed (e.g., by the computing device) in a manner analogous to that previously described herein. For example, the additional Voronoi partition can include a number of vertices defined by the locations of the existing wireless network access points and the additional wireless network access point in a manner analogous to that previously described herein.

A location to place the another additional wireless network access point in the area can be determined (e.g., by the computing device) based on the additional Voronoi partition in a manner analogous to that previously described herein. For example, the location to place the another additional wireless network access point in the area can correspond to the vertex in the additional Voronoi partition that is farthest from its defining locations and in the area, the line segment intersection with the boundary of the area that is farthest from its three closest wireless network access points, and/or the vertex in the additional Vornoi partition having the worst predicted and/or measured location accuracy in the area, in a manner analogous to that previously described herein.

The another additional wireless network access point can then be placed at the determined location in the area, and it can be determined again (e.g., by the computing device) whether another (e.g., a third) additional wireless network access point is needed in the area in a manner analogous to that previously described herein. If it is determined that another (e.g., a third) additional wireless network access point is needed in the area, the above process can continue to be repeated until it is determined that no additional wireless network access points are needed in the area.

Figure 2:
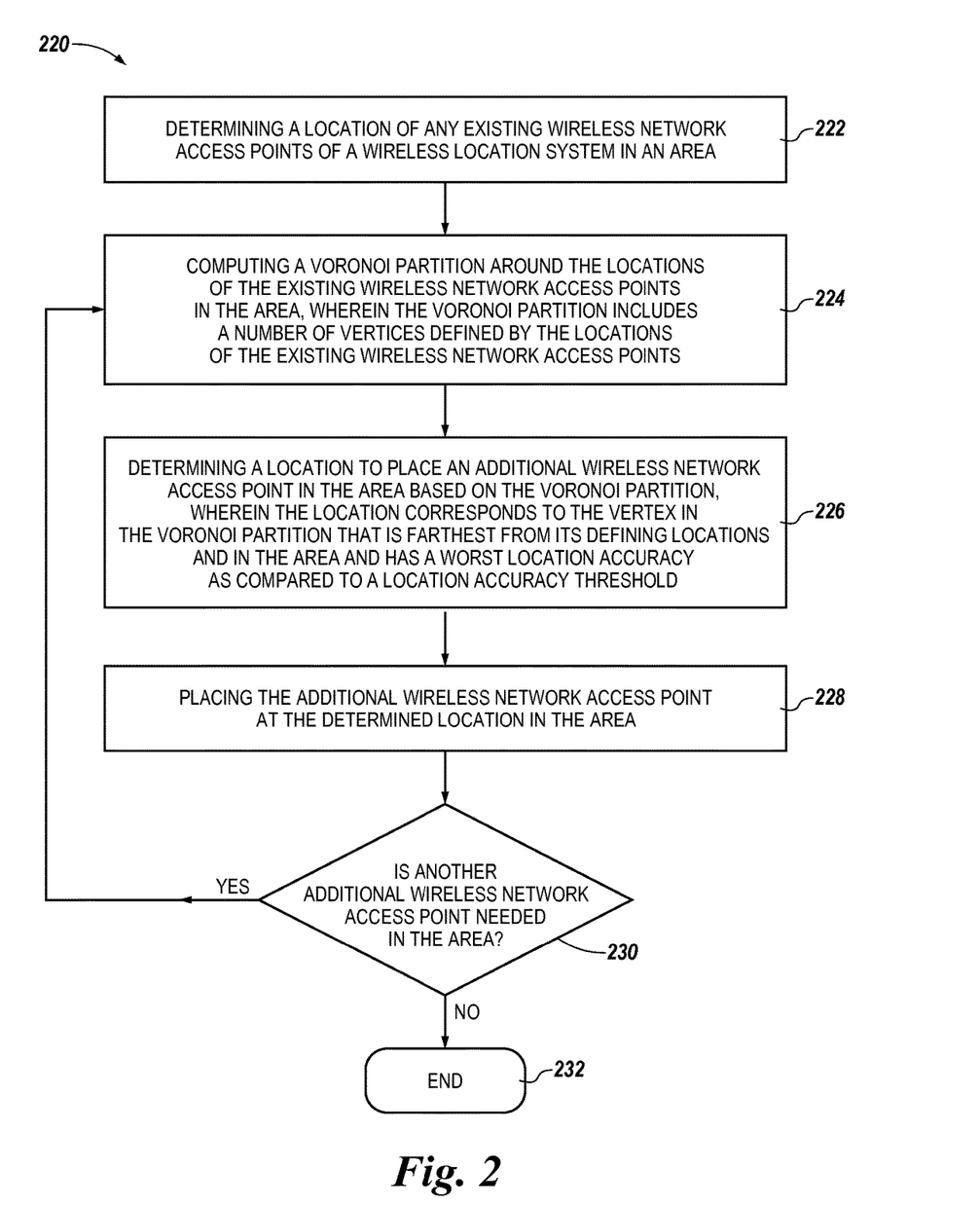
FIG. 2 illustrates a method for placement of a wireless network access point in accordance with one or more embodiments of the present disclosure.

FIG. 2 illustrates a method 220 for placement of a wireless network access point in accordance with one or more embodiments of the present disclosure. Method 220 can be performed by, for example, a computing device, such as computing device 340 further described herein (e.g., in connection with FIG. 3).

At block 222, method 220 includes determining a location of any existing wireless network access points of a wireless location system in an area. The existing wireless network access points can be, for example, wireless network access points 102-1, . . . , 102-5 in area 104 previously described herein (e.g., in connection with FIG. 1A), and their location can be determined in a manner analogous to that previously described herein (e.g., in connection with FIG. 1A).

In some embodiments, there may be no existing wireless network access points in the area. In such embodiments, a plurality of wireless network access points can be placed in the area and treated as the existing wireless network access points. The plurality of wireless network access points can be placed at any location in the area (e.g., the plurality of wireless network access points can be placed in the area in a symmetrical or non-symmetrical pattern). The placement of the plurality of wireless network access points can depend on, for example, the characteristics of the area, and may be selected by, for example, the operator of the wireless location system.

At block 224, method 220 includes computing a Voronoi partition around the locations of the existing wireless network access points in the area, wherein the Voronoi partition includes a number of vertices defined by the locations of the existing wireless network access points. The Voronoi partition can be analogous to the Voronoi partition previously described herein (e.g., in connection with FIG. 1B), the number of vertices included in the Voronoi partition can be, for example, vertices 110-1, . . . , 110-4 previously described herein (e.g., in connection with FIG. 1B), and the Voronoi partition can be computed in a manner analogous to that previously described herein (e.g., in connection with FIG. 1B).

At block 226, method 220 includes determining a location to place an additional wireless network access point in the area based on the Voronoi partition, wherein the location corresponds to the vertex in the Voronoi partition that is farthest from its defining locations and in the area and has a worst location accuracy as compared to a location accuracy threshold. The additional wireless network access point can be, for example, wireless network access point 102-6 previously described herein (e.g., in connection with FIG. 1C), and the location to place the additional wireless network access point can be determined in a manner analogous to that previously described herein (e.g., in connection with FIG. 1B).

At block 228, method 220 includes placing the additional wireless network access point at the determined location in the area. The additional wireless network access point can be placed at the determined location in a manner analogous to that previously described herein (e.g., in connection with FIG. 1C).

At block 230, method 220 includes determining whether another additional wireless network access point is needed in the area. The determination of whether another additional wireless network access point is needed in the area can be analogous to that previously described herein.

If it is determined at block 230 that no additional wireless network access point is needed in the area, method 220 ends at block 232. If it is determined at block 230 that another additional wireless network access point is needed in the area, method 220 returns to block 224, and blocks 224, 226, 228, and 230 can be repeated until it is determined that no additional wireless network access point is needed in the area.

Figure 3:
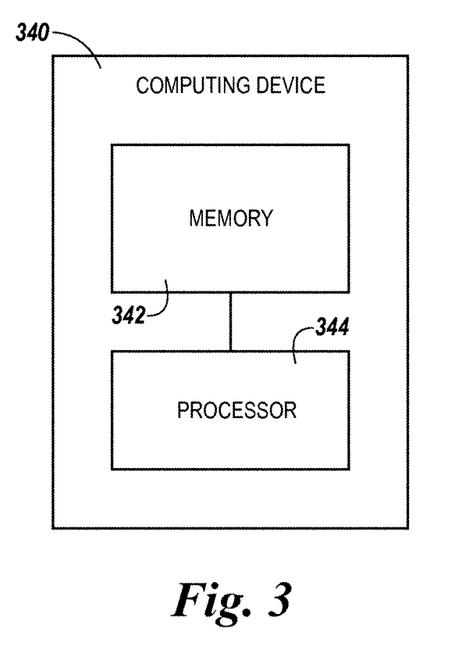
FIG. 3 illustrates a computing device for placement of a wireless network access point in accordance with one or more embodiments of the present disclosure.

FIG. 3 illustrates a computing device 340 for placement of a wireless network access point in accordance with one or more embodiments of the present disclosure. Computing device 340 can be, for example, a laptop computer, a desktop computer, or a mobile device (e.g., a mobile phone, a personal digital assistant, etc.), among other types of computing devices.

As shown in FIG. 3, computing device 340 includes a memory 342 and a processor 344 coupled to memory 342. Memory 342 can be any type of storage medium that can be accessed by processor 344 to perform various examples of the present disclosure. For example, memory 342 can be a non-transitory computer readable medium having computer readable instructions (e.g., computer program instructions) stored thereon that are executable by processor 344 to place a wireless network access point in accordance with one or more embodiments of the present disclosure.

Memory 342 can be volatile or nonvolatile memory. Memory 342 can also be removable (e.g., portable) memory, or non-removable (e.g., internal) memory. For example, memory 342 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 342 is illustrated as being located in computing device 340, embodiments of the present disclosure are not so limited. For example, memory 342 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer implemented method for placement of a wireless network access point, comprising:
    determining a location to place a wireless network access point in an area based on a Voronoi partition, wherein:
        the Voronoi partition includes a number of vertices defined by locations of existing wireless network access points in the area;
        the location to place the wireless network access point corresponds to a vertex in the Voronoi partition that is farthest from its defined locations and in the area; and
        the location to place the wireless network access point corresponds to a vertex in the Voronoi partition that has a worst location accuracy as compared to a location accuracy threshold within the existing wireless network points.

2. The method of claim 1, wherein the method includes computing the Voronoi partition around the locations of the existing wireless network access points.

3. The method of claim 2, wherein said computing the Voronoi partition around the locations of the existing wireless network access points includes dividing the area into a number of regions using a number of line segments.

4. The method of claim 1, wherein the method includes determining the locations of the existing wireless network access points.

5. The method of claim 1, wherein the method includes determining a location to place an additional wireless network access point in the area based on an additional Voronoi partition.

6. The method of claim 5, wherein:
    the additional Voronoi partition includes a number of vertices defined by the locations of the existing wireless network access points and the location of the wireless network access point in the area; and
    the location to place the additional wireless network access point corresponds to a vertex in the additional Voronoi partition that is farthest from its defining locations and in the area.

7. The method of claim 5, wherein the method includes determining the location to place the additional wireless network access point upon determining that the additional wireless network access point is needed in the area.

8. A computing device for placement of a wireless network access point, comprising:
    a memory; and
    a processor configured to execute non-transitory executable instructions stored in the memory to determine a location to place the wireless network access point in an area by dividing the area into a number of regions using a number of line segments, wherein:
        each of the number of line segments is equidistant from two existing wireless network access points in the area and intersects with two other line segments at a location equidistant from its three closest existing wireless network access points in the area; and
        the location to place the wireless network access point corresponds to a line segment intersection of the each of the number of line segments that has a worst location accuracy as compared to a location accuracy threshold within existing wireless network access points.

9. The computing device of claim 8, wherein each of the number of regions has a location accuracy threshold associated therewith.

10. The computing device of claim 8, wherein the location to place the wireless network access point corresponds to the line segment intersection that is farthest from the three closest wireless network access points and in the area.

11. The computing device of claim 8, wherein each of the number of regions includes a different one of the existing wireless network access points.

12. The computing device of claim 8, wherein the location to place the wireless network access point corresponds to a line segment intersection with a boundary of the area.

13. A system for placement of a wireless network access point, comprising:
    a number of wireless network access points of a wireless location system in an area; and
    a computing device configured to determine a location to place an additional wireless network access point in the area based on a Voronoi partition, wherein:
        the Voronoi partition includes a number of vertices, wherein each of the number of vertices is defined by locations of three of the number of wireless network access points in the area; and
        the location to place the additional wireless network access point corresponds to the vertex in the Voronoi partition that:
            is farthest from its defining locations and in the area; and
            has a worst location accuracy in the number of wireless network access points in the area.

14. The system of claim 13, wherein the number of wireless network access points are wireless network access points of a wireless location system.

15. The system of claim 13, wherein the computing device is configured to:
    determine whether another additional wireless network access point is needed in the area; and
    determine, upon determining that the another additional wireless network access point is needed in the area, a location to place the another additional wireless network access point based on an additional Voronoi partition.

16. The system of claim 15, wherein the computing device is configured to compute the additional Voronoi partition around the locations of the number of wireless network access points and the location of the additional wireless network access point.

17. The system of claim 15, wherein the computing device is configured to determine whether the another additional wireless network access point is needed in the area based on a location accuracy of the wireless location system in the area.

18. The system of claim 15, wherein the computing device is configured to determine whether the another additional wireless network access point is needed in the area based on a quantity of the number of wireless network access points.

* * * * *